(No Model.)

H. P. WELLS.
CARRIAGE.

No. 480,307. Patented Aug. 9, 1892.

Witnesses
Eugene Humphrey
H. E. Kunick Jr.

Inventor
Harlan P. Wells
per T. W. Porter Atty

UNITED STATES PATENT OFFICE.

HARLAN P. WELLS, OF AMESBURY, MASSACHUSETTS, ASSIGNOR OF ONE-HALF TO OSGOOD MORRILL, OF SAME PLACE.

CARRIAGE.

SPECIFICATION forming part of Letters Patent No. 480,307, dated August 9, 1892.

Application filed February 29, 1892. Serial No. 423,118. (No model.)

*To all whom it may concern:*

Be it known that I, HARLAN P. WELLS, of Amesbury, in the county of Essex and State of Massachusetts, have invented a new and useful Improvement in Carriages, which will, in connection with the accompanying drawings, be hereinafter fully described, and specifically defined in the appended claims.

Figures 1, 3:
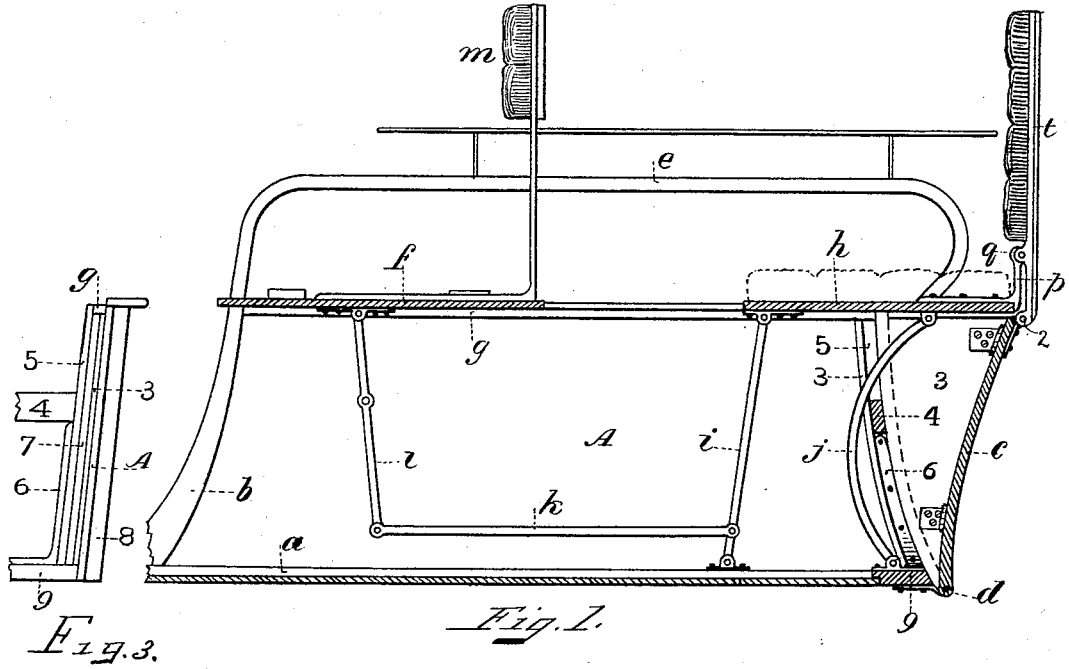
Figure 2:
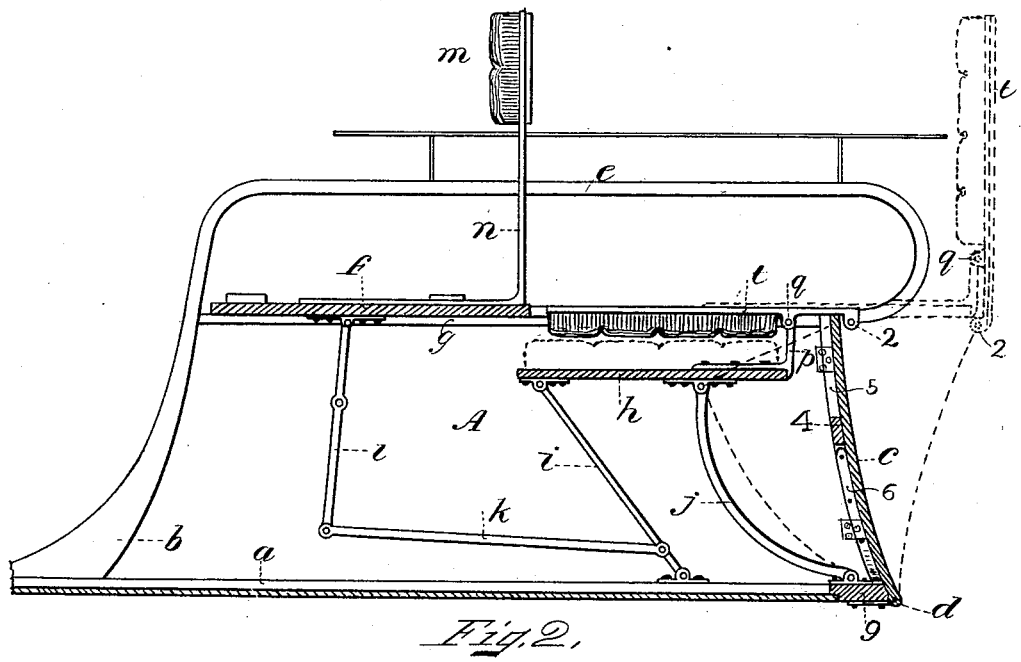

In said drawings, Figure 1 is a side elevation of a carriage-body and seats embodying my invention, both seats being in position for use. Fig. 2 is a view similar to Fig. 1, but showing the rear seat as turned down to serve as the deck-panel, thus rendering the carriage single-seated. In both said views the front of the body is broken away for want of space and as being immaterial to this specification. Fig. 3 is a detached rear elevation showing the right-hand side of the vehicle-body and the construction and arrangement of the constituent parts.

The object of my invention is to produce a carriage convertible at will into either a single or double seated vehicle, and in which the back of the rear seat, when not in use as such, will serve as a deck-panel, the rear seat and tail-board being so connected that the opening and closing of the latter will actuate the rear seat, so as to raise and lower the same and fold down and elevate the back, while, if preferred, the front seat may be so connected with the rear seat as to be varied in its position by the movement of the rear seat; and the invention consists in divers features of novelty and the combinations thereof, as will next be described, and then claimed.

Referring again to said drawings, A represents the side panel of the body, the side sill being shown at $a$ and a front pillar at $b$, and the tail-board at $c$, which is hinged at $d$ to the lower corners of the body. A side body-rail is shown at $e$ and the front seat at $f$ as resting upon ledge $g$ of the body and as provided with lazy-back $m$, supported by standards $n$, while the rear seat $h$ is supported upon the jumping-irons $i j$, which at their respective ends are pivoted to said seat and sill $a$ in a well-known manner, as shown. The back $t$ of the rear seat is pivoted to the upper part of tail-board $c$ at 2, and is also pivoted at $q$ to the upper end of the vertical arm of the angle-iron $p$, that is secured to seat-bottom $h$. Hence when the tail-board is opened to the position shown in Fig. 1 it draws seat $h$ rearward and at the same time irons $i j$ raise the seat, which rising movement elevates back $t$ by reason of its pivoted connection with seat $h$ through angle-iron $p$, as already explained. When the tail-board is closed, the reverse movement of seat $h$ and its back $t$ takes place and the parts automatically assume the position shown in Fig. 2. When the rear seat is thus raised into position for use, the front seat is moved forward a limited distance by the action of connector $k$ and scale-bar $l$, while the lowering of the rear seat moves the front seat rearward a limited distance, in order to more properly dispose the load relatively to the base of the vehicle. A stay-bar 4 serves as the stop and stay of seat $h$ when in use, iron $j$ then resting against said bar, as shown in Fig. 1. Said bar at its ends is secured to the inner pillar 5, which is arranged to leave space 7 between it and panel A, and is at its upper end secured to ledge $g$, while its lower end is secured in cross-sill 9, an angle-iron 6 securing the parts in place. The outer end pillar 8 serves to add strength to panel A and serves as the abutment of tail-board $c$ when closed.

To fill the space between the tail-board and the rear end of panel A when the board is open, I secure a sliding panel 3 at its rear end to the tail-board, while it is arranged in said space 7 so as to slide freely therein when the tail-board is opened or closed, and thus secures a continuous panel in appearance.

It will be obvious that all parts shown as pertaining to that side of the body shown—the right-hand side—will in practicing the invention be duplicated at the left-hand side.

The means for adjusting the position of the front seat are not claimed by me, nor do I claim the adjustable or telescopic sections of panel attached to the tail-board; but What I do claim is—

1. In a two-seat vehicle, the combination of a rising and falling seat, a hinged tail-board, and a seat-back formed to also serve as a deck-panel and hinged both to the seat and tail-board in manner to be closed down as a deck-panel by the closing of the tail-board and to be raised into position as a seat-back by the opening of the tail-board, substantially as specified.

2. In a two-seat vehicle, the combination of tail-board c, pivoted to the body, back t, pivoted to said tail-board, and the rising and falling seat h, pivoted to back t by the rigid angle-iron p, whereby the opening and closing of the tail-board will automatically raise and lower said seat-back and will raise and lower said seat, substantially as specified.

3. The combination of seat h, supported by irons i j, pivoted to said seat and to the body, tail-board c, pivoted at its lower edge to the body, and back t, connected with said seat by pivot q in seat-iron p and also pivoted at 2 to said tail-board, all substantially as specified.

HARLAN P. WELLS.

Witnesses:
G. U. BRIGGS,
DELL W. DOLBUR.